US010047916B2

(12) United States Patent
Pelletier

(10) Patent No.: US 10,047,916 B2
(45) Date of Patent: Aug. 14, 2018

(54) LED PIXEL DEVICE WITH DYNAMIC DIFFUSER EFFECTS

(71) Applicant: Martin Professional APS, Aarhus N. (DK)

(72) Inventor: Paul Pelletier, Quebec (CA)

(73) Assignee: MARTIN PROFESSIONAL APS, Aarhus N (DK)

( * ) Notice: Subject to any disclaimer, the term of this patent is extended or adjusted under 35 U.S.C. 154(b) by 211 days.

(21) Appl. No.: 14/784,935

(22) PCT Filed: Jun. 2, 2014

(86) PCT No.: PCT/DK2014/050154
§ 371 (c)(1),
(2) Date: Oct. 15, 2015

(87) PCT Pub. No.: WO2014/194915
PCT Pub. Date: Dec. 11, 2014

(65) Prior Publication Data
US 2016/0146407 A1    May 26, 2016

(30) Foreign Application Priority Data
Jun. 7, 2013   (DK) .................................. 2013 70310

(51) Int. Cl.
*F21K 99/00*       (2016.01)
*G09F 9/33*        (2006.01)
(Continued)

(52) U.S. Cl.
CPC ................. *F21K 9/50* (2013.01); *F21K 9/60* (2016.08); *F21V 14/02* (2013.01); *F21V 14/08* (2013.01);
(Continued)

(58) Field of Classification Search
None
See application file for complete search history.

(56) References Cited

U.S. PATENT DOCUMENTS 7,352,339 B2      4/2008 Morgan et al.
2005/0265029 A1  12/2005 Epstein et al.
(Continued)

FOREIGN PATENT DOCUMENTS

WO      2005045793 A1      5/2005

OTHER PUBLICATIONS

International Search Report having Application No. PCT/DK2014/050154, dated Aug. 28, 2014.
(Continued)

*Primary Examiner* — Tony N Ngo
(74) *Attorney, Agent, or Firm* — Artegis Law Group, LLP

(57) ABSTRACT

The present invention relates to a LED pixel device comprising: a plurality of individual controllable LED pixels arranged in an array; a LED pixel controller adapted to control said number of individual controllable LED pixels; an optical diffuser arranged in front of at least a part of said LED pixels, said optical diffuser receive light from said LED pixels and diffuses the received light; at least one diffuser actuator adapted to moved said LED pixels and said optical diffuser in relation to each other, diffuser controller adapted to control the diffuser actuator; wherein the optical diffuser and the LED pixels can be moved between a non-mixing position and a mixing position, where in said non-mixing position the light emitted by the LED pixels are separated when hitting the optical diffuser and where in the mixing position the light emitted by said LED pixels are at least partial overlapping when hitting said optical diffuser. The
(Continued)

present invention relates also to an optical diffuse mountable at a LED pixel device and movable in relation the LED pixel device.

20 Claims, 15 Drawing Sheets

(51) Int. Cl.

| | |
|---|---|
| G02B 19/00 | (2006.01) |
| G02B 7/00 | (2006.01) |
| G02B 5/02 | (2006.01) |
| F21V 14/02 | (2006.01) |
| F21V 14/08 | (2006.01) |
| G09G 3/32 | (2016.01) |
| G09G 5/10 | (2006.01) |
| F21K 9/60 | (2016.01) |
| F21Y 115/10 | (2016.01) |

(52) U.S. Cl.
CPC ......... *G02B 5/0278* (2013.01); *G02B 5/0294* (2013.01); *G02B 7/005* (2013.01); *G02B 19/0066* (2013.01); *G09F 9/33* (2013.01); *G09G 3/32* (2013.01); *G09G 5/10* (2013.01); *F21Y 2115/10* (2016.08); *G09G 2300/046* (2013.01); *G09G 2300/0469* (2013.01)

(56) References Cited

U.S. PATENT DOCUMENTS

| | | | |
|---|---|---|---|
| 2007/0070062 A1* | 3/2007 | Boll | H04N 13/0493 |
| | | | 345/419 |
| 2008/0106901 A1 | 5/2008 | Calmes et al. | |
| 2009/0241388 A1* | 10/2009 | Dunn | G09F 9/33 |
| | | | 40/463 |
| 2010/0027085 A1 | 2/2010 | Catalano | |
| 2010/0188018 A1 | 7/2010 | Salm et al. | |
| 2011/0103074 A1 | 5/2011 | Jurik | |
| 2011/0292302 A1* | 12/2011 | Park | G02B 19/0071 |
| | | | 348/739 |
| 2012/0147059 A1 | 6/2012 | Chen et al. | |
| 2013/0314512 A1* | 11/2013 | Watanabe | H04N 13/0402 |
| | | | 348/51 |
| 2015/0253623 A1* | 9/2015 | Lee | G02F 1/133504 |
| | | | 349/64 |

OTHER PUBLICATIONS

Extended European Search Report for EP Application No. 14807824.9 dated Dec. 9, 2016, 7 pages.

* cited by examiner

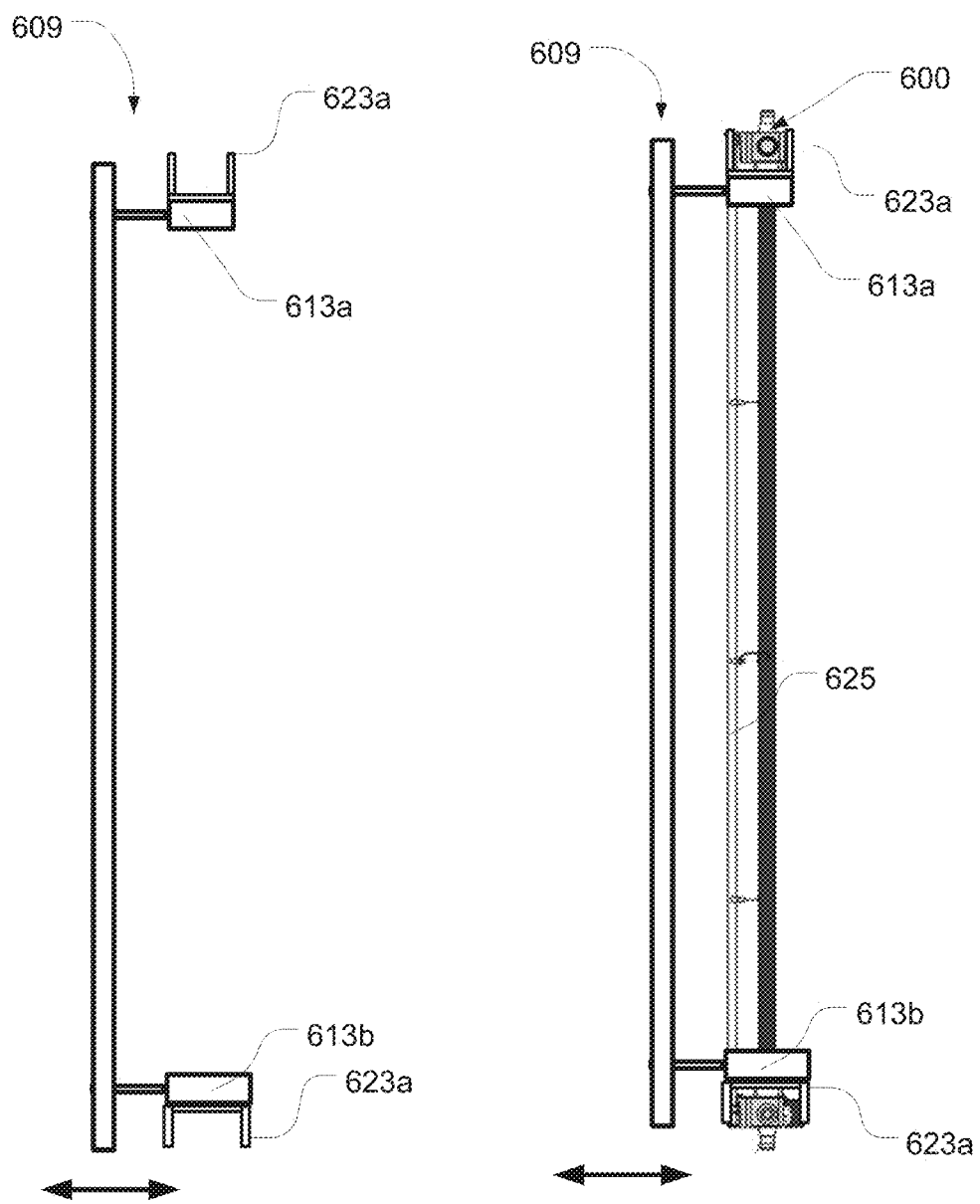

LED PIXEL DEVICE WITH DYNAMIC DIFFUSER EFFECTS

CROSS-REFERENCE TO RELATED APPLICATIONS

The present application is a national stage application of international patent application number PCT/DK2014/050154 titled, "LED PIXEL DEVICE WITH SYNAMIC DIFFUSER EFFECTS," filed on Jun. 2, 2014, which claims priority to Denmark Application No. PA2013 70310, titled, "LED PIXEL DEVICE WITH SYNAMIC DIFFUSER EFFECTS," filed on Jun. 2, 2013. The subject matter of this related application is hereby incorporated herein by reference.

FIELD OF THE INVENTION

The present invention relates to a configurable LED pixel device comprising a plurality of LED pixels and a LED controller adapted to control the LED pixels and where at least at part of the LED pixel are covered by an optical diffuser. The present invention relates further to a pixel display system comprising a central controller and a number of LED pixel devices, where the pixel devices are covered by an optical diffuser.

BACKGROUND OF THE INVENTION

LED pixel devices where a number of LED pixels are used to create dynamic graphical elements is widely known and used in the field of visual solutions. For instance the LED pixel devices can be used to generate dynamic graphics elements in connection with architectural installations or as a part of a stage in connection with an entertainment event. Typically each LED pixel comprises a number of red LEDs, a number of blue LEDs and a number of green LEDs which can be dimmed in relation to each other whereby a large number of colors can be created by each LED pixel as known in the art of additive color mixing and LED video display systems. Presently there exists a number of different types of products which can be used to create dynamic graphical elements ranging from simple LED pixel devices with few LED pixels (typical 5-10 pixels) to high resolution LED pixel screens with a large number of LED pixels (+1000 pixels) arranged in flat rectangular array. Flexible LED pixel devices, where the LED pixels are provide as a flexible structure for instance a flexible LED pixel string do also exist. The use of the different LED pixel devices depend on the desired look and the structure wherein in the LED pixel devices are used. Today the visual appearance of the dynamic graphical elements primarily depends on the content (dynamic scenes and/or video material) provided to the LED pixel devises. However the appearance does also depend on type of LED pixel devices, where they and how they are placed in relation to each other. Further it is known that different optics e.g. diffusers can be arranged in connection with the LED devices in order to change the appearance of the LED pixel devices. During a show or an event the appearance of the LED pixel divides are often changed in order to provide different scenes and moods and new content are as a consequence executed at the LED pixel devices. Further there is a desire to provide new and existing content for the LED pixel devices.

DESCRIPTION OF THE INVENTION

The object of the present invention is to solve the above described limitations related to prior art. This is achieved by a configurable LED pixel device, a display system and method as described in the independent claims. The dependent claims describe possible embodiments of the present invention. The advantages and benefits of the present invention are described in the detailed description of the invention.

DESCRIPTION OF THE DRAWING

FIG. 6a-6c illustrate a movable optical diffuser according to the present invention;

DETAILED DESCRIPTION OF THE INVENTION

Figure 1A:
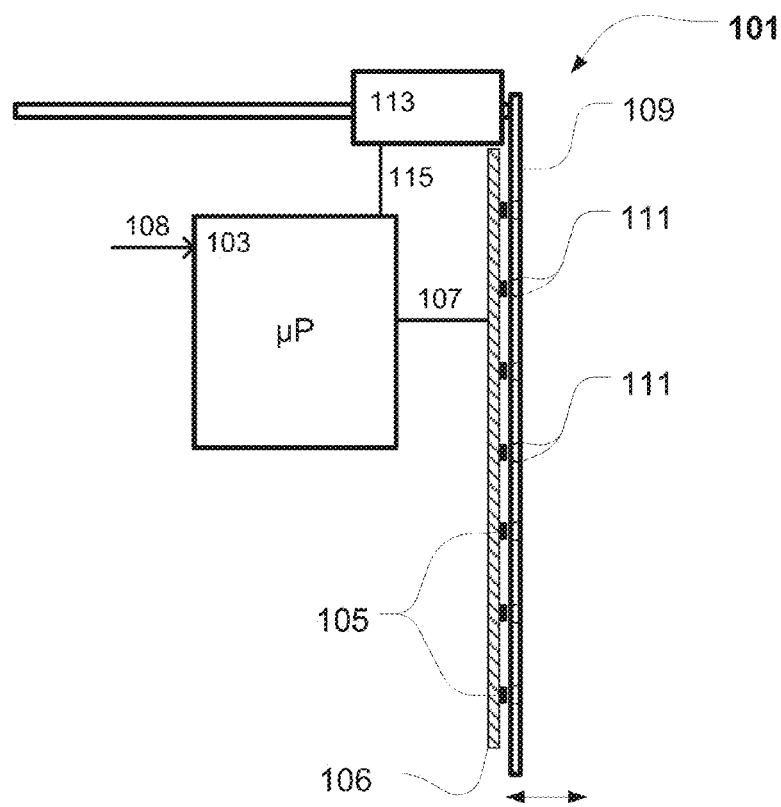
FIG. 1a-1e illustrate a LED pixel device according to the present invention.

The figures serve to illustrate the principles and different aspects of the present invention and the skilled person realizes that the present invention can be carried out in many embodiments varying from those shown in the figures.

FIG. 1a-1d illustrate a simplified block diagram of a LED pixel device 101 according to the present invention. The LED pixel device 101 comprises a controller 103 adapted to control a number of individual controllable LED pixels 105 (illustrated as black quadrangles) arranged in an array as known in the art of LED pixel devices. In the illustrated embodiment the LED pixels are mounted on a printed circuit board (PCB) 106. The LED pixel comprises a number of LEDs, which can be turned on and off and/or dimmed in order to adjust the visual appearance of the pixel. In some embodiments the LED pixel comprises a number of red LEDs, a number of blue LEDs and a number of green LEDs which can be dimmed in relation to each other, whereby a large number of colors can be created by each LED pixel. The LEDs can be any kind of LEDs such a solid state emitters and/or organic LEDs. In the illustrated embodiment the controller 103 is embodied as a micro controller which typically comprises a processor, a memory and a number of input and output ports for instance for communication and/or sensing purposes. However it is noticed that the controller also can be embodied as separate components and does not need to be integrated in to a micro controller. The controller is connected to the LED pixels 105 through a number of communication lines 107 (illustrated as a solid line). Even though that only one line is illustrated, it is to be understood that more than one line may connect the controller and LED Pixels.

The LED pixel device comprises further an optical diffuser 109 arranged in front of at least a part of the LED pixels. The optical diffuser receives light from the LED pixels and diffuses the received light. The light from the LED pixels is thereby refracted and diffused by the optical diffuser. This effect is illustrated by the fact that the light beams 111 from the LEDs are refracted by the optical diffuser. It is to be understood that the illustrated light beams only illustrates the principle of the optical diffuser and that these does not illustrate exact light beams. A person looking at the optical diffuser we see the pixels as larger and smoothed out compared to the situation without diffuser. The optical diffuser thus changes the appearance of the LED pixel device.

Figure 1B:
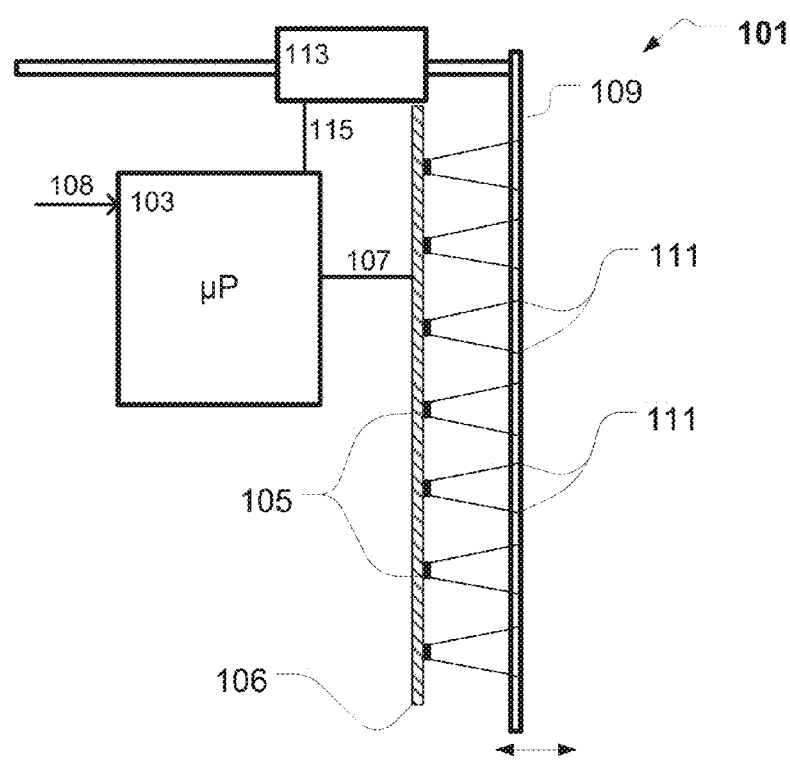
Figure 1C:
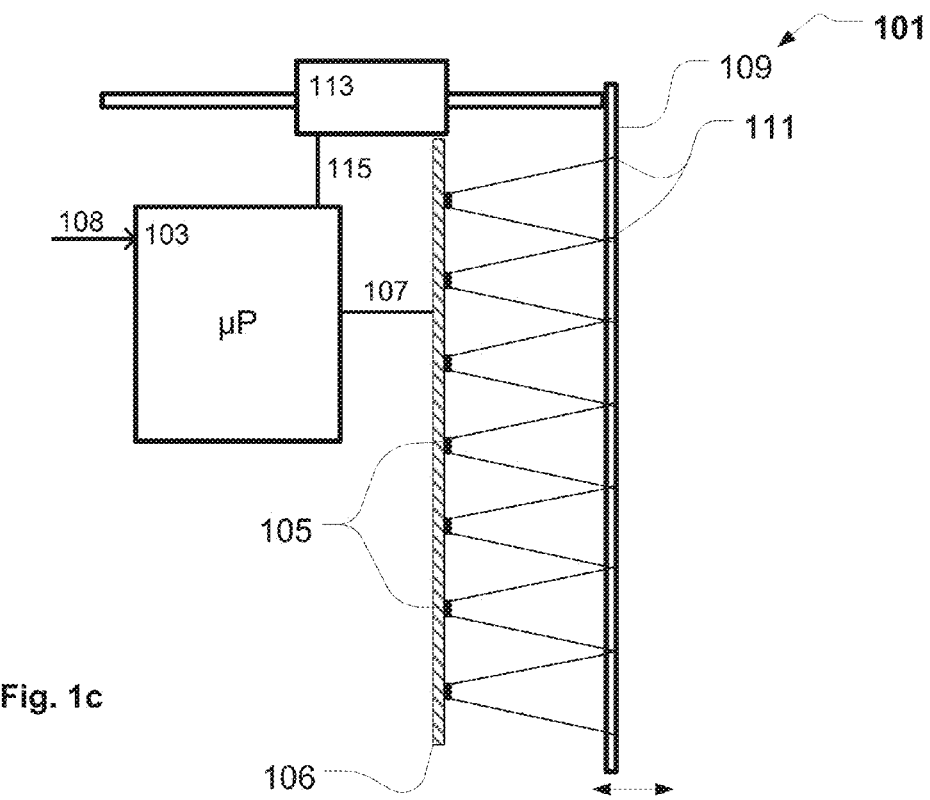
Figure 1D:
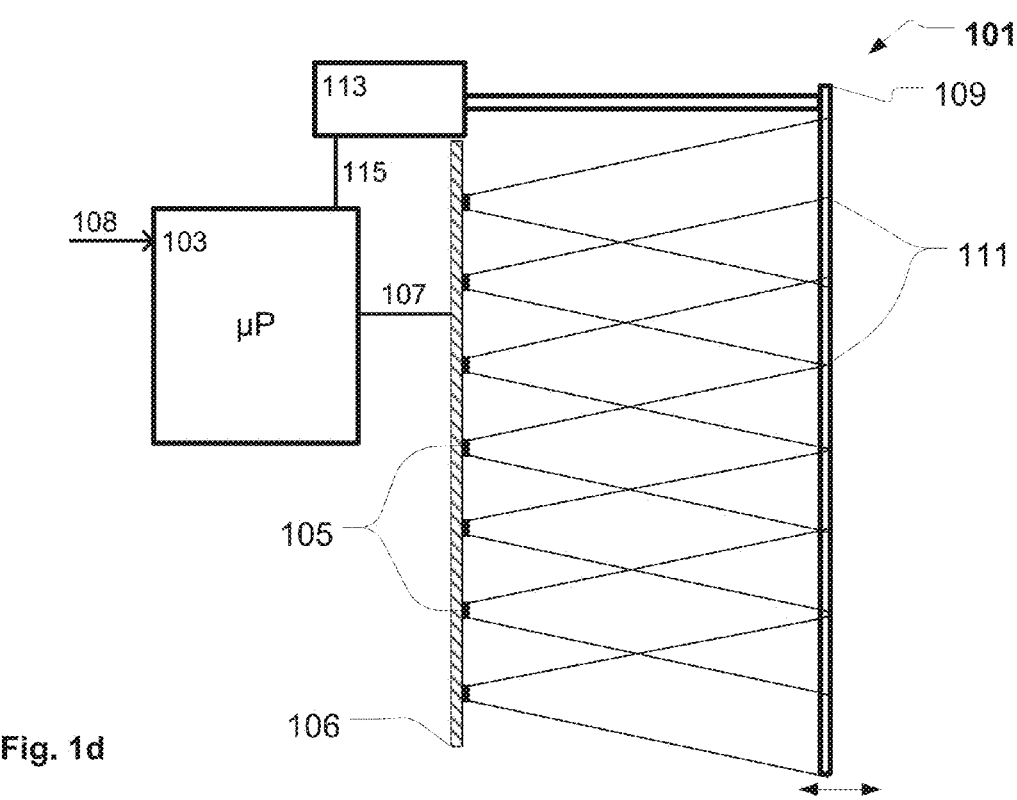

The LED pixel device comprises at least one actuator 113 adapted to move the LED pixels and the optical diffuser in relation to each other. In the illustrated embodiment the actuator 113 is adapted to move the optical diffuser in relation to the LED pixels and FIG. 1a illustrates a situation where the optical diffuser 109 is arranged adjacent the LED pixels FIG. 1b-1d illustrate situations where the optical diffuser have been moved further away from the LED pixels. However, it is to be understood that the actuator also can be adapted to move the LED pixels in relation to the optical diffuser, which then is fixed as illustrated in FIGS. 3 and 4. Further it is possible to provide a number of actuators where both the LED pixels and optical diffuser can be moved simultaneously, for instance as illustrated in FIG. 5. The actuator can be embodied as any actuator capable of moving the optical diffuser and LED pixels in relation to each other for instance a linear actuator as illustrated in FIG. 1a-1d or rotary actuators illustrated on FIG. 5. It is also to be understood that the actuator also can move the LED pixels and/or the optical diffuser using any mechanical system for instance comprising gears, tooth wheels, belts, chains or any other mechanical components.

Figure 1E:
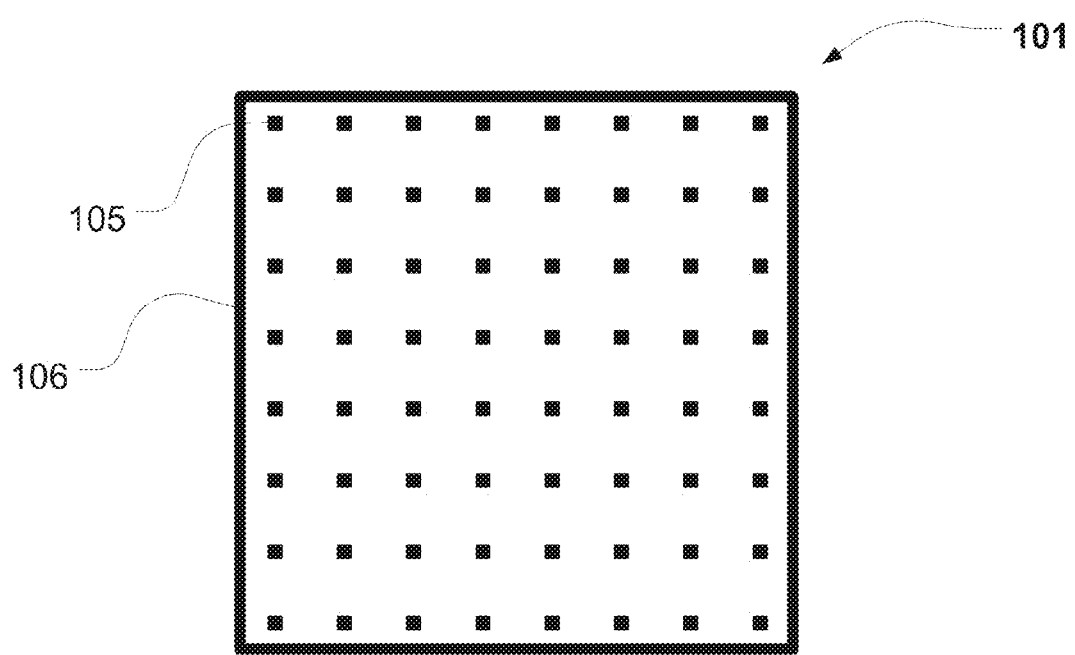

The controller 103 is adapted to control the actuator through communication line 115. In the illustrated embodiment the controller is adapted to control both the LED pixels and the actuator 113, however it is to be understood that the controller can be embodied as separate controller controlling respectively the LED pixels and the actuator or as a central controller adapted to control distributed controllers like drivers or the like. FIG. 1e illustrates a top view of the PCB 106 and shows that the LEDs are arranged in an 8×8 array and it is to be understood that any number of LED pixels can be used.

In this embodiment the controller is adapted to receive an input signal 108 and the input signal is indicative of pixel data related to the LED pixels. The pixel data can for instance be indicative of color and/or brightness that the LED pixel must create. The controller is adapted to control the number of LED pixels based on the pixel data and can for instance adjust the color and/or brightness of the individual LED pixels according the pixel data. The input signal can be generated and send by a central controller (e.g. media server, PC, and/or light controller) that are adapted to control a number of LED pixels devices as known in the art of entertainment system such as light systems and/or display systems. The input signal can also be indicative of other commands and instructions intended for the LED Pixel device.

The illustrated LED pixel device according to the present invention makes it possible to create new video effects where the look/appearance of the video effect changes dynamically. This is achieved as the optical diffuser and LED pixels dynamically can be moved in relation to each other whereby the look and appearance of the pixels is changed due to the fact that the diffusing degree is changed when the optical diffuser and LED pixels is moved in relation to each other. The diffusing degree can thus be changed while executing video effects, whereby a new and alternative dynamical effect is provided. In addition the LED pixel device according to the present invention makes it possible for the light designers to change the diffusing degree of the video elements during a show without the need to physically change the optical diffusers and thereby avoids disturbing the show. For instance in one part of the show the optical diffuser and LED pixels can be arrange in a certain position in relation to each other in order to create a first diffuser effect and in another part of the show be arranged at a second position in relation to each other in order to create a different diffuser effect.

Figure 2A:
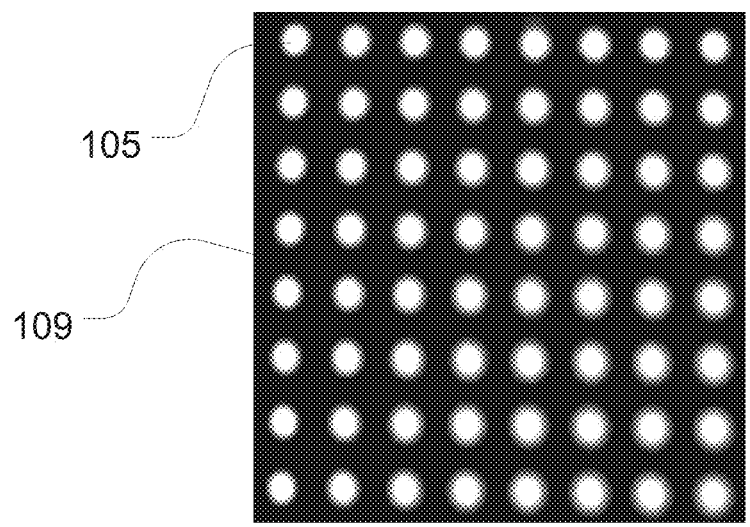
FIG. 2a-2d illustrate front views of the LED pixel according to the present invention with the diffuser arranged at different distances from the LED pixels.
Figure 2B:
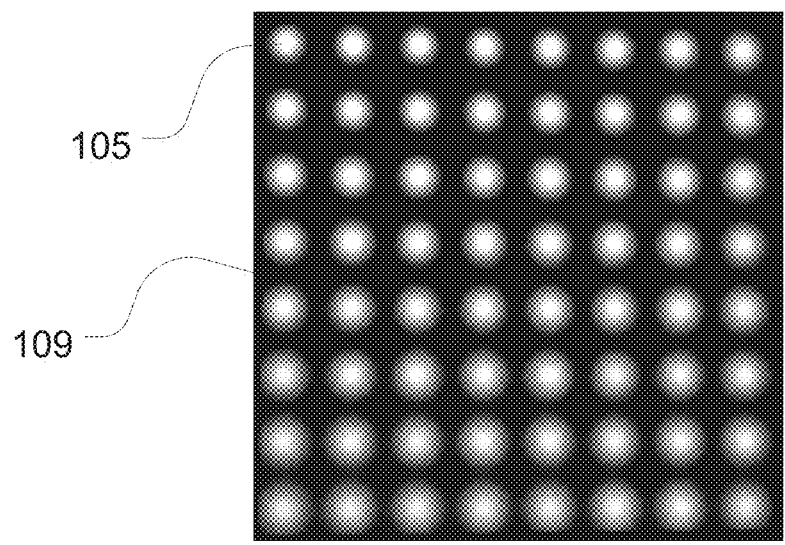
Figure 2C:
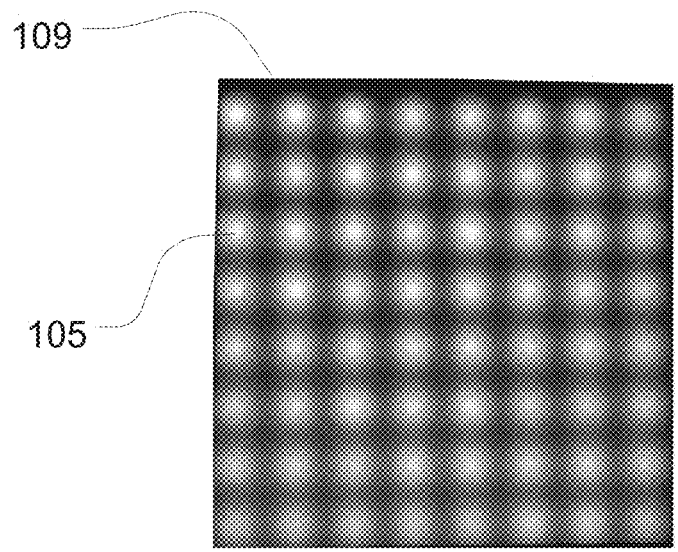

FIG. 2a-2d illustrates a front view of the LED pixel device shown FIG. 1a-1d and with the optical diffuser at different positions. FIG. 2a corresponds to the position illustrated in FIG. 1a; FIG. 2b corresponds to the position illustrated in FIG. 1b; FIG. 2c corresponds to the position illustrated in FIG. 1c and FIG. 2d corresponds to the position illustrated in FIG. 1d. The front view illustrates a grayscale of the light distribution at the output surface of the optical diffuser, where white illustrates the brightest spots and black illustrate dark areas. The front views have been recorded with the LED pixels illuminating white light.

In FIG. 1a the LED pixels and optical diffuser is arranged adjacent the LED pixels and the light from the LED enter thus a limited area of the optical diffuser. The pixels appear as separated clear spots with only a small degree of diffusing. This can be seen in FIG. 2a by the fact that the edges of each pixel are sharp and that dark areas appears between the pixels.

In FIG. 1b the LED pixels and optical diffuser have been moved in relation to each other and thereby separated. In this position the light from the LED pixels hits a larger area of the optical diffuser but do not overlap when hitting the optical diffuser. The optical diffuser smoothens out the light and as can be seen in FIG. 2b the pixels appear larger and more smooth than in FIG. 2a.

In FIG. 1c the LED pixels and optical diffuser have been separated even further. In this position light from the LED pixels hits a larger area of the optical diffuser and does nearly overlap when hitting the optical diffuser. The optical diffuser smoothens out the light and as can be seen in FIG. 2c the pixels appear larger and the pixels are further partially mixed which creates further effects. In LED devices where the LED pixels can emit multiple colors, mixing zones, where light from two neighboring pixels are mixed, can be created. The color of the mixing zones will appear as a third color when the two neighboring pixels emitters different colors. The size of the mixing zones can be change by moving the optical diffuser and LED pixels in relation to each other, whereby additional visual effects can be created.

Figure 2D:
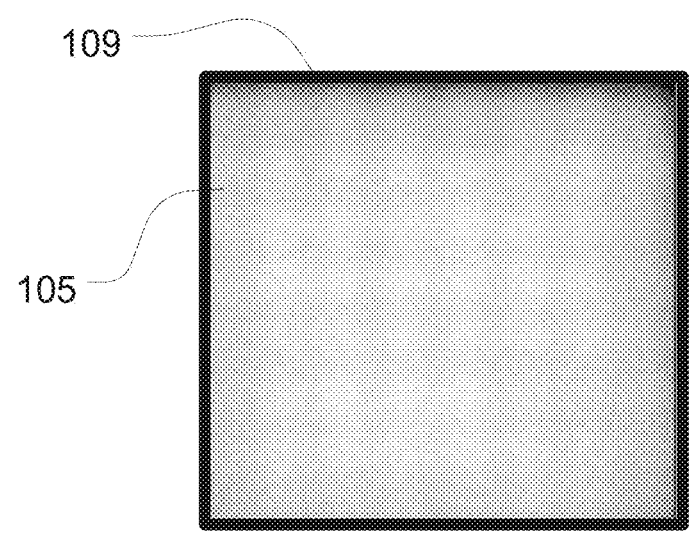

In FIG. 1d the LED pixels and optical diffuser have been separated even further. In this position light from the LED pixel hits a larger area of the optical diffuser and overlaps when hitting the optical diffuser. The diffuser smoothens out the light and mixes the light from neighboring LED pixels and as can be seen in FIG. 2d there are nearly no dark areas. If the LED pixels and optical diffuser are separated even more the dark areas can be eliminated and the optical diffuser can appear as a surface having homogeneous light distribution. If the same color is emitted by the LED pixels the optical diffuser will appear as a homogenous surface having the same color emitted by the LED pixels and it would not be possible to differentiate the pixels.

The movable optical diffuser and LED Pixel device according to the present invention makes it possible to provide both a pixilated LED pixel device and a homogenous lighting surface which appears as homogenous lighting surface with a nice equal light distribution.

Figure 3A:
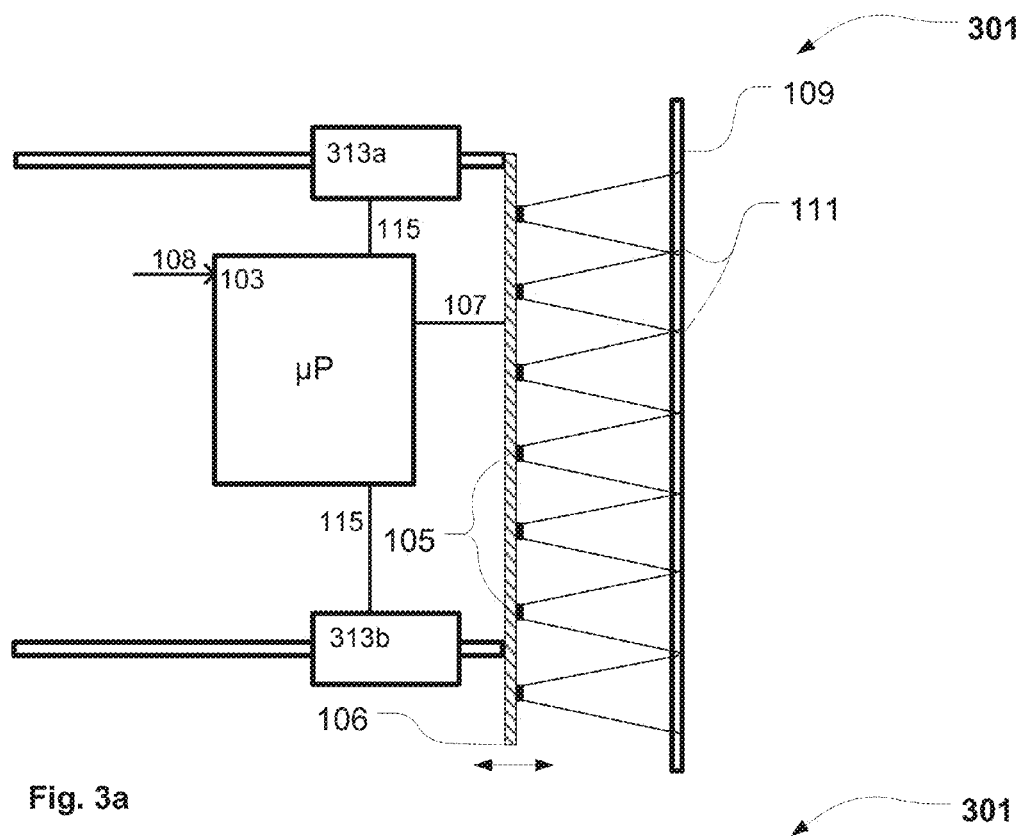
FIG. 3a-3d illustrate another embodiment of a LED pixel device according to the present invention.
Figure 3B:
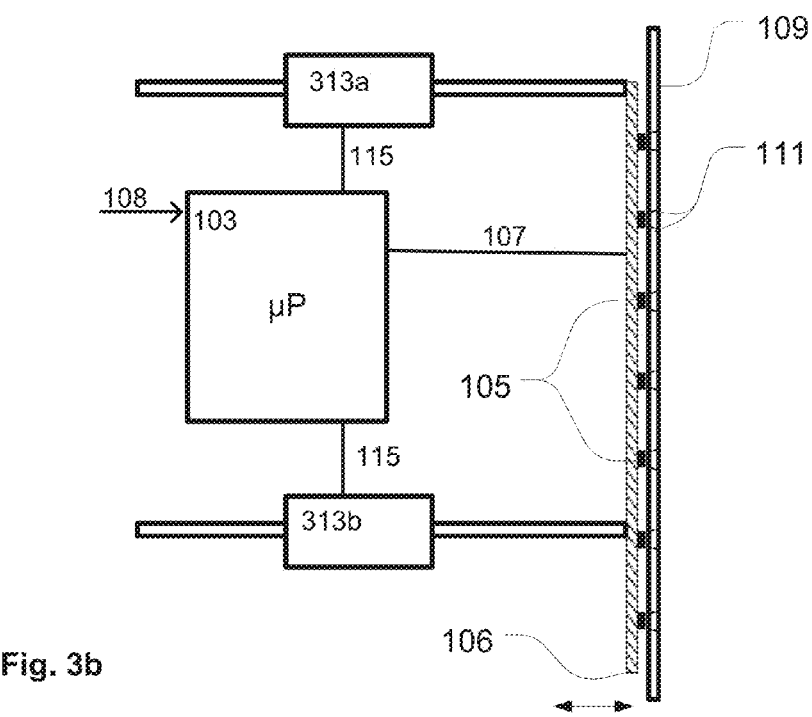
Figure 3C:
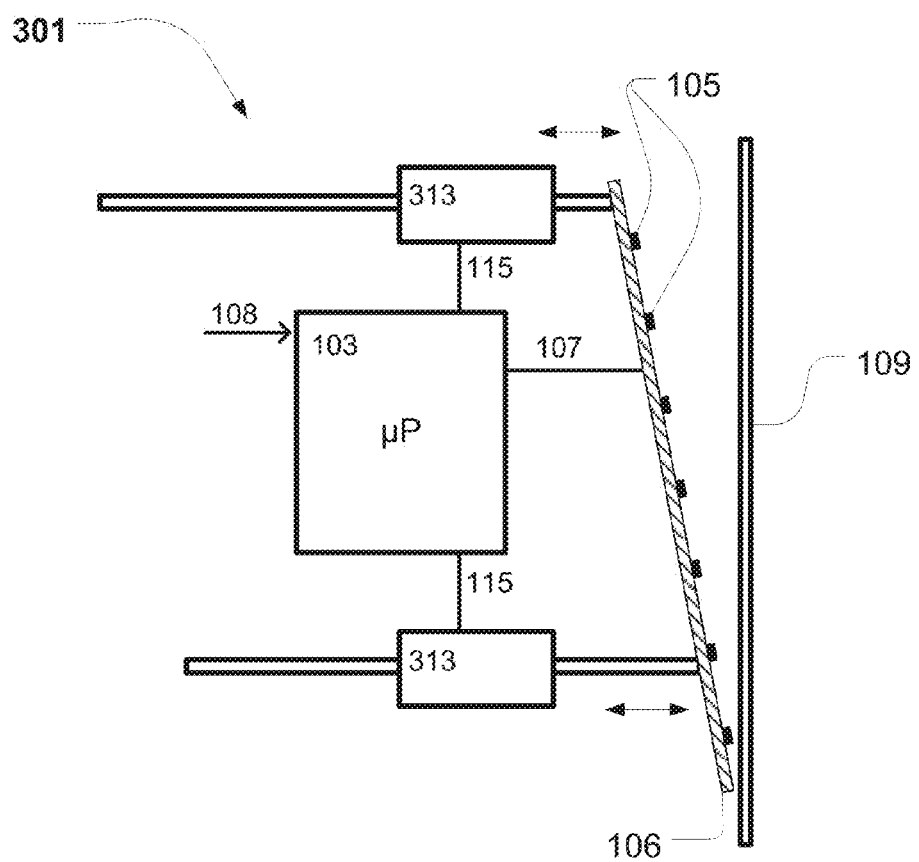
Figure 3D:
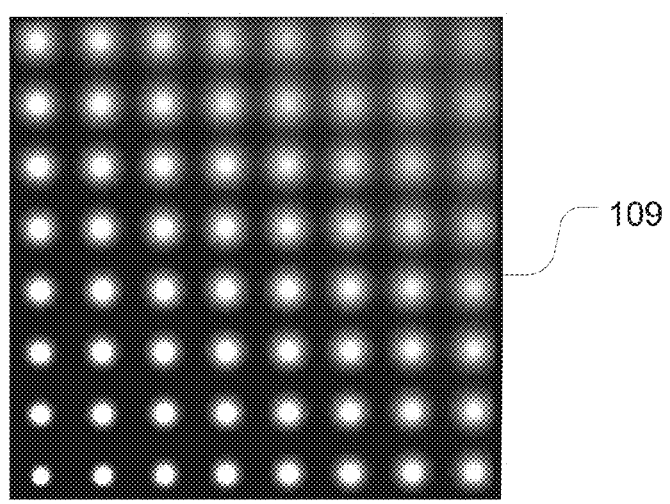

FIG. 3a-3d illustrate a simplified block diagram of another LED pixel device 301 according to the present invention. This LED pixel device is similar the LED pixel device 101 shown in FIG. 1a-1d and substantial identical features are labeled with the same reference numbers as in FIG. 1a-1d and will not be described in further detail. In this embodiment the LED pixel device comprises a plurality of actuators 313a-b adapted to move the LED pixels 105 in relation a to fixed optical diffuser 109. As illustrated in FIGS. 3a and 3b the controller can be adapted to move the plurality of actuators synchronously whereby the LED pixels is moved in relation the optical diffuser in such way that the distance between the all LED pixels and the optical diffuser is equal. However as illustrated in FIG. 3c the controller 103 can also be adapted to control the plurality of actuators 313a-b individually. This makes it possible to arrange the LED pixels at different distance to the optical diffuser whereby the diffuser effect can change across the optical diffuser. This is illustrated in FIG. 3d, which shows a front view of the optical diffuser 109 and illustrates a situation where the LED pixels at the upper right corner is arrange longer from the optical diffuser than the LED pixels at the lower left corner. As a consequence the diffusing degree of the LED pixels changes across the LED pixel device and the diffusing degree across the LED pixel device can be changed dynamically by controlling the actuators individually. For instance in an embodiment four actuators may be adapted to move the four corners of a quadrangle LED pixel array individually. It is to be understood that any number of actuators can be adapted to moved different parts of the LED pixel array and the optical diffuser in relation to each other. Further it is to be understood that a plurality of actuators alternatively can be adapted to move the optical diffuser in relation the LED pixel array.

Figure 4A:
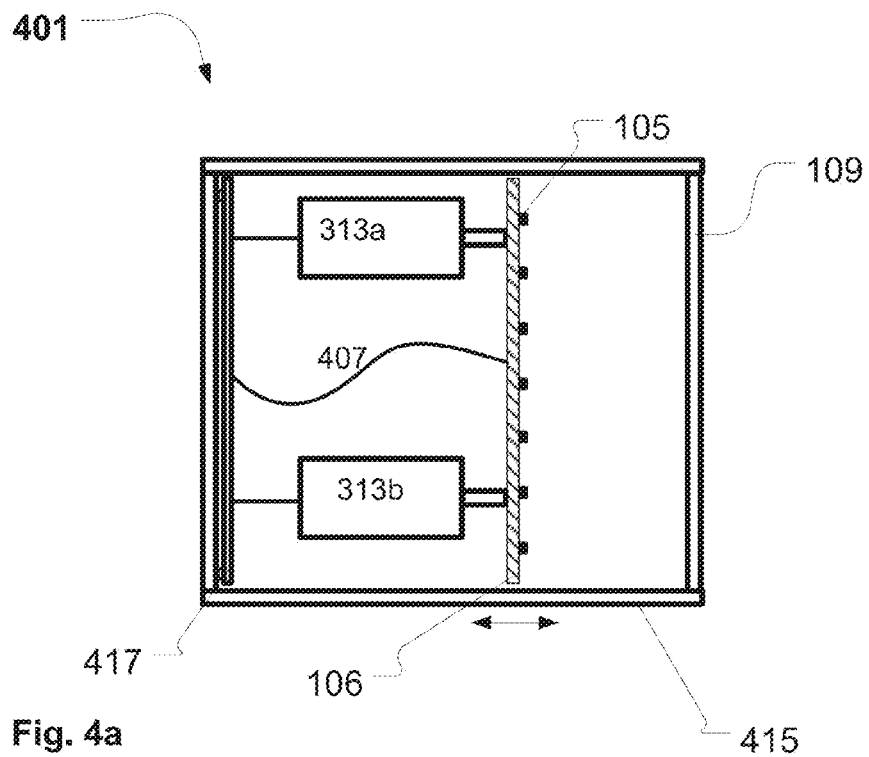
FIG. 4a-4b illustrate another embodiment of a LED pixel device according to the present invention.
Figure 4B:
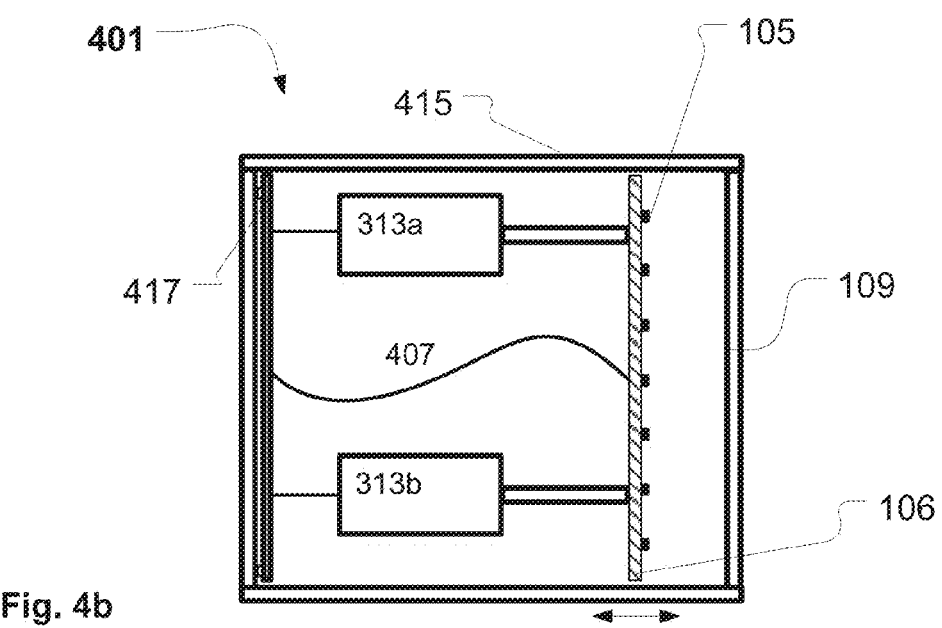
Figure 5A:
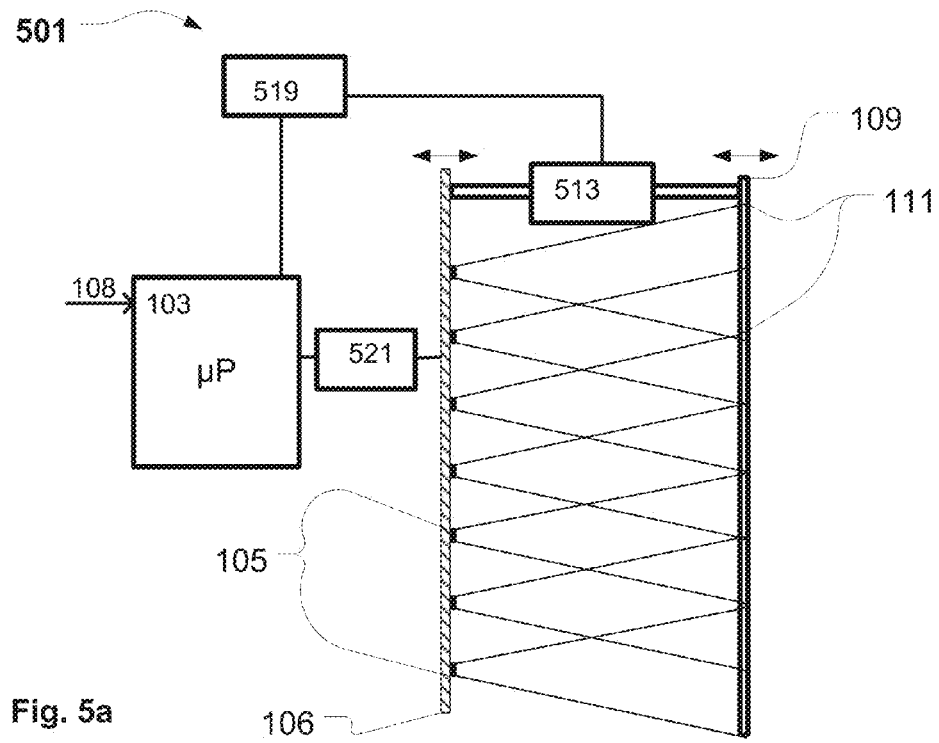
FIG. 5a-5b illustrate another embodiment of a LED pixel device according to the present invention.
Figure 5B:
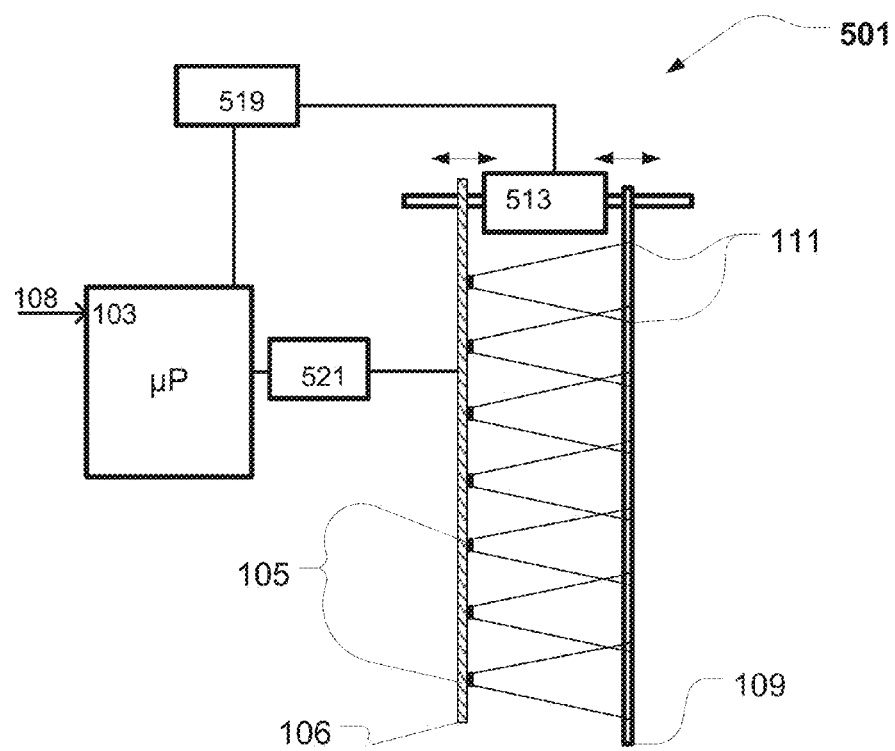

FIG. 4a-4b illustrate another embodiment of the LED pixel device 401 according to the present invention. This LED pixel device is similar to the LED pixel device 301 shown in FIG. 3a-3d and substantial identical features are labeled with the same reference numbers as in FIG. 3a-3d and will not be described in further detail. In this embodiment the LED pixel device illustrated in FIG. 3a-3d have been integrated into a housing 415, where the optical diffuser 109 have been fixed at the front side of the housing. The LED pixels 105 are arranged on a PCB 109 which can be moved by actuators 313a and 313b as described in connection with FIG. 3a-3b. The controller is integrated into a PCB 417 also arranged inside the housing 415. The control line between the controller and LED pixels is embodied as a flexible cable 407 which allows movement of the LED pixels inside the housing. The housing can be embodied in many different ways depending on usage and can also comprise cooling means which enables cooling of the electronic components inside the housing.

FIG. 5a-5d illustrate a simplified block diagram of another LED pixel device 501 according to the present invention. This LED pixel device is similar the LED pixel device 101 shown in FIG. 1a-1d and substantial identical features are labeled with the same reference numbers as in FIG. 1a-1d and will not be described in further detail. In this embodiment the actuator 513 is adapted to move both the optical diffuser 109 and the LED pixels 105 when adjusting the distance between the optical diffuser and LED pixels. In this embodiment the actuator is a rotating actuator having a threaded axel interacting with threaded holes at the optical diffuser and the PCB 106. The threads at the PCB and optical diffuser adapted such that the optical diffuser and LED pixels move towards each other when the actuator axel rotates one way and away from each other when the actuator axel rotates the other way. Further the LED pixel device 501 comprises distributed actuator driver 521 adapted to control the actuator 513 based on a signal received from controlling mean 103, which acts as a main controller. Similar the LED pixel device comprises distributed LED pixel controller 519 adapted to control the LED pixels based on a signal received from the main controller 103.

Figure 6C:
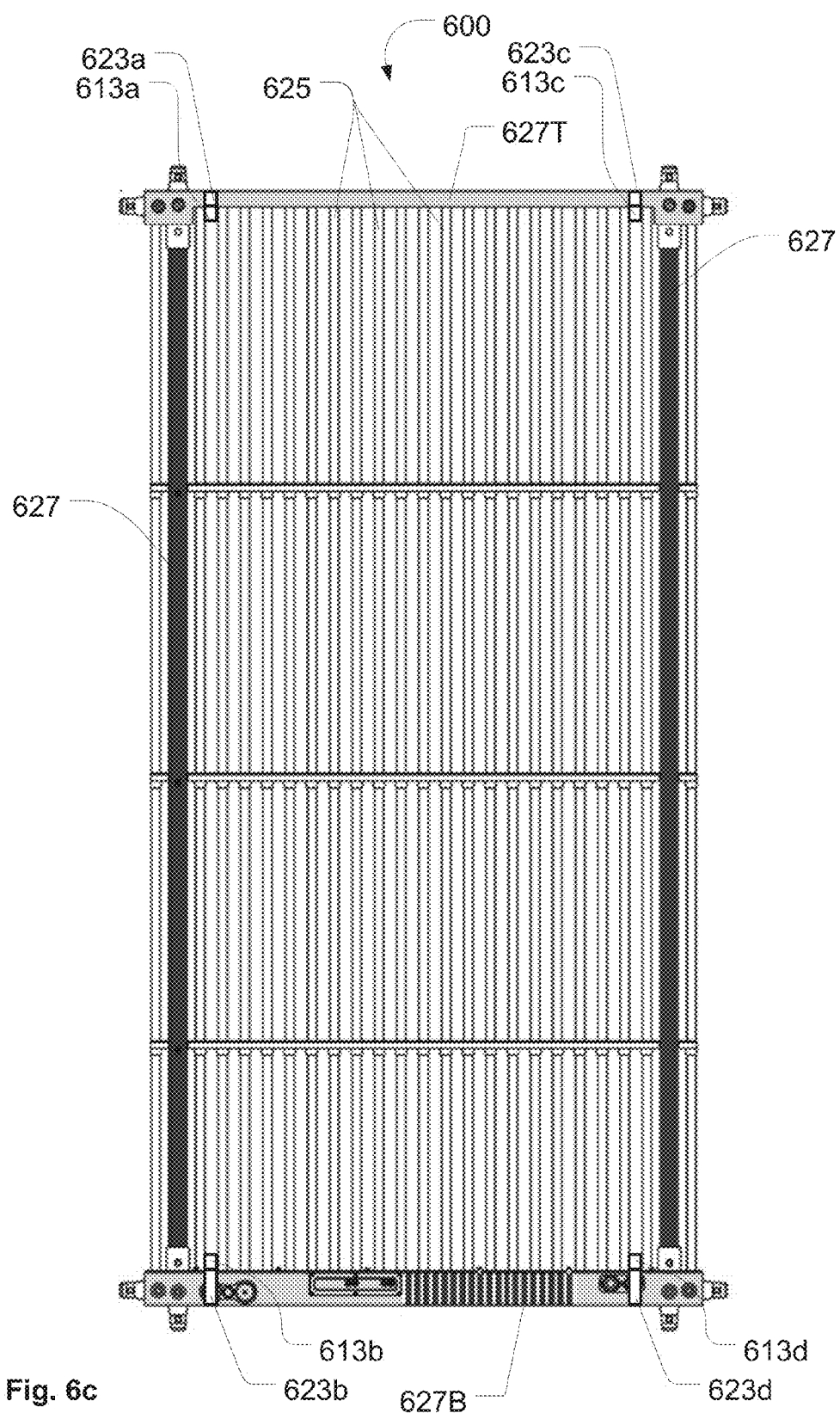

FIG. 6a-6c illustrate an optical diffuser 609 according to another aspect of the present invention, where FIG. 6a illustrates a side view of the optical diffuser 609. FIG. 6b illustrate a side view of the optical diffuser 609 mounted an LED pixel device 600 and FIG. 6c illustrates a rear view of a LED pixel device 600 with the optical diffuser 609 mounted thereto. The optical diffuser comprises an optical diffuser adapted to diffuse light from a plurality of LED pixels of LED pixel device. The optical diffuser 609 comprises mounting mechanisms 623a-d adapted to arrange the optical diffuser 609 in front of the LED pixels of a LED pixel device. Further the optical diffuser comprises number of actuators 613a-613d adapted to move the optical diffuser in relation to the LED pixels, when arranged at the LED pixel device. In the illustrated embodiment the mounting mechanism are embodied as number of clamps adapted to interact with a structure of the LED pixel device whereby the optical diffuser 609 can be attached to the LED Pixel device 600. In the illustrated embodiment the LED pixel device 600 comprises a number of LED Pixels (not shown) arranged in a number of separate LED columns 625. The LED columns are supported by a frame comprising a top 627T, bottom 627B and sides 627. The clamps of the mounting mechanism are adapted to be secured at the top and bottom part of the frame of the LED pixel device, but can also be secured to the side parts. The actuators of the optical diffuser device are attached to the clamps and extend through the LED columns 225 to the other side of the LED columns, where the optical diffuser is positioned. The actuators can then move the optical diffuser in relation the LED pixel as described above. The illustrated embodiment served just as an example of how the optical diffuser 609 can be adapted to be secured to a LED pixel device and it is noticed that a person skilled in mechanical systems will be able to construct many different solution on to attach the optical diffuser and actuator to a LED pixel device. The optical diffuser according to the present invention makes it possible to turn existing LED Pixel devices into a LED pixels device according to the present invention, as the diffuser device can be provided as an accessory. The actuators can be controlled by the control systems adapted to control the LED pixel device and dynamical diffuser effects can hereby be created.

Figures 7A, 7B:
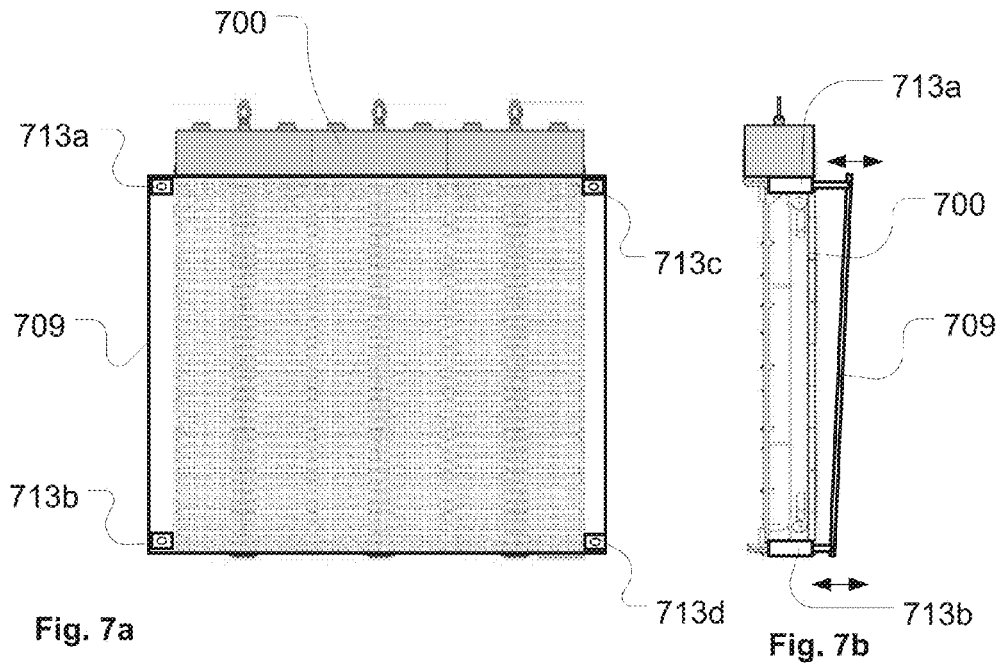
FIG. 7a-7b illustrate another movable optical diffuser according to the present invention.

FIG. 7a-7b illustrate another embodiment an optical diffuser 709 for a LED pixel device 700, where FIG. 7a is a front view and FIG. 7b is a side view. In this embodiment a number of actuators 713a-d are embodied as separate components individual attachable to the LED pixel device. The actuators 713a-d can be mounted at the sides of the LED pixel device 700. The optical diffuser 709 can then be provided as a stiff diffuser plate which can be connected to the actuators whereby the optical diffuser can be moved in relation to the LED pixel device 700. By providing the actuators as separate components individual attachable to the LED pixel device makes it possible to configuring existing LED pixel devices into a LED pixel devices according to the present invention. It is to be understood that the separate individual attachable actuators need also to be connected to a control system adapted to move actuators such that the diffuser plate moves in relation to the LED pixel device. The actuators can be moved individual as shown in FIG. 7*b* by the fact that upper actuator 713*a* has been moved/arranged the diffuser at a greater distance from the LED pixel device than the lower actuator 713*b*.

Figures 8A, 8B:
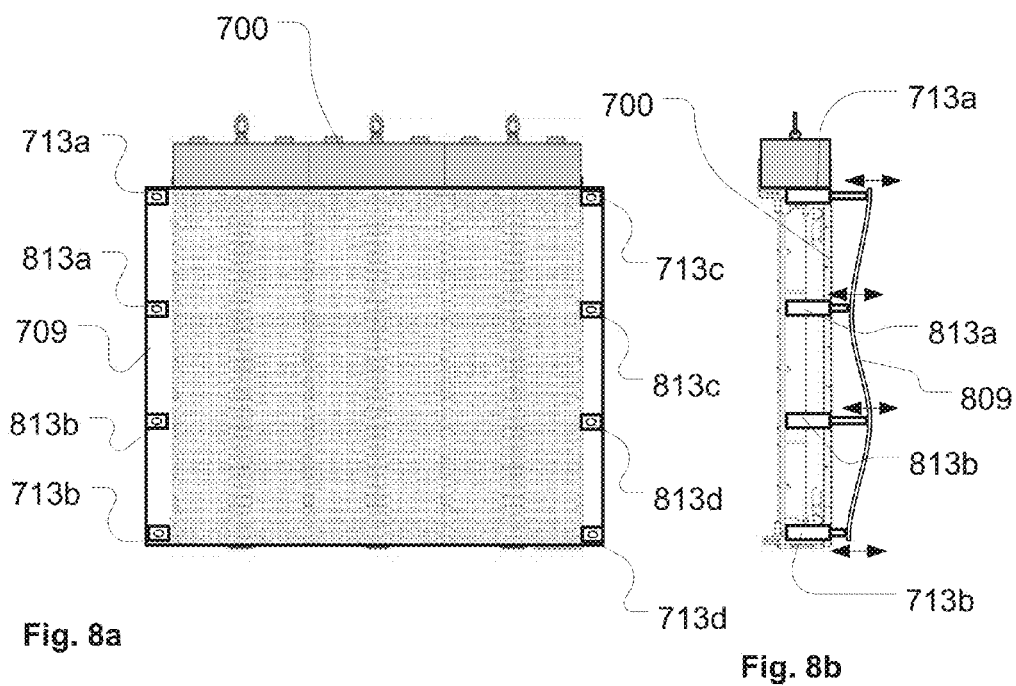
FIG. 8a-8b illustrate an alternative embodiment of the optical diffuser and pixel device according to the present invention.

FIG. 8*a*-8*b* illustrate an alternatively embodiment of the optical diffuser and LED pixel device of FIG. 7*a*-*b*; where FIG. 8*a* is a front view and FIG. 8*b* is a side view. Substantial identical features are labeled with the same reference numbers as in FIG. 7*a*-*b*. In this embodiment the optical diffuser 809 is provided as a flexible foil or fabric. The corners of the flexible optical diffuser 809 are connected to the actuator 713*a*-713*b*. Further an number of additional actuators 813*a*-*d* are mounted at the sides of the LED pixel device 700 and these are connected at middle parts of the side of the flexible optical diffuser 809. The consequence is it that the flexible optical diffuser 809 can be arrange in a large variety of distances from the LED device and different parts of the flexible optical diffuser can be arranged at different distances from the LED pixel device. Different diffusing effects can hereby be provided at different parts of the LED pixel device. For instance as illustrate in FIG. 8*b* the parts of the optical diffuser connected to actuator 813*a* and 713*b* are arrange closer to the LED pixel device than the parts of the optical diffuser connected to actuators 713*a* and 813*b*. It is to be understood that the actuators can be controlled individually, whereby a large variety of diffuser effects can be created due to the different distances between the optical diffuser and the LED pixel device across the LED pixel device. Further it is also possible to provide actuators at a central part of the LED pixel device and let a central actuators move a central part of the optical diffuser in relation to the LED pixel device.

Figure 9:
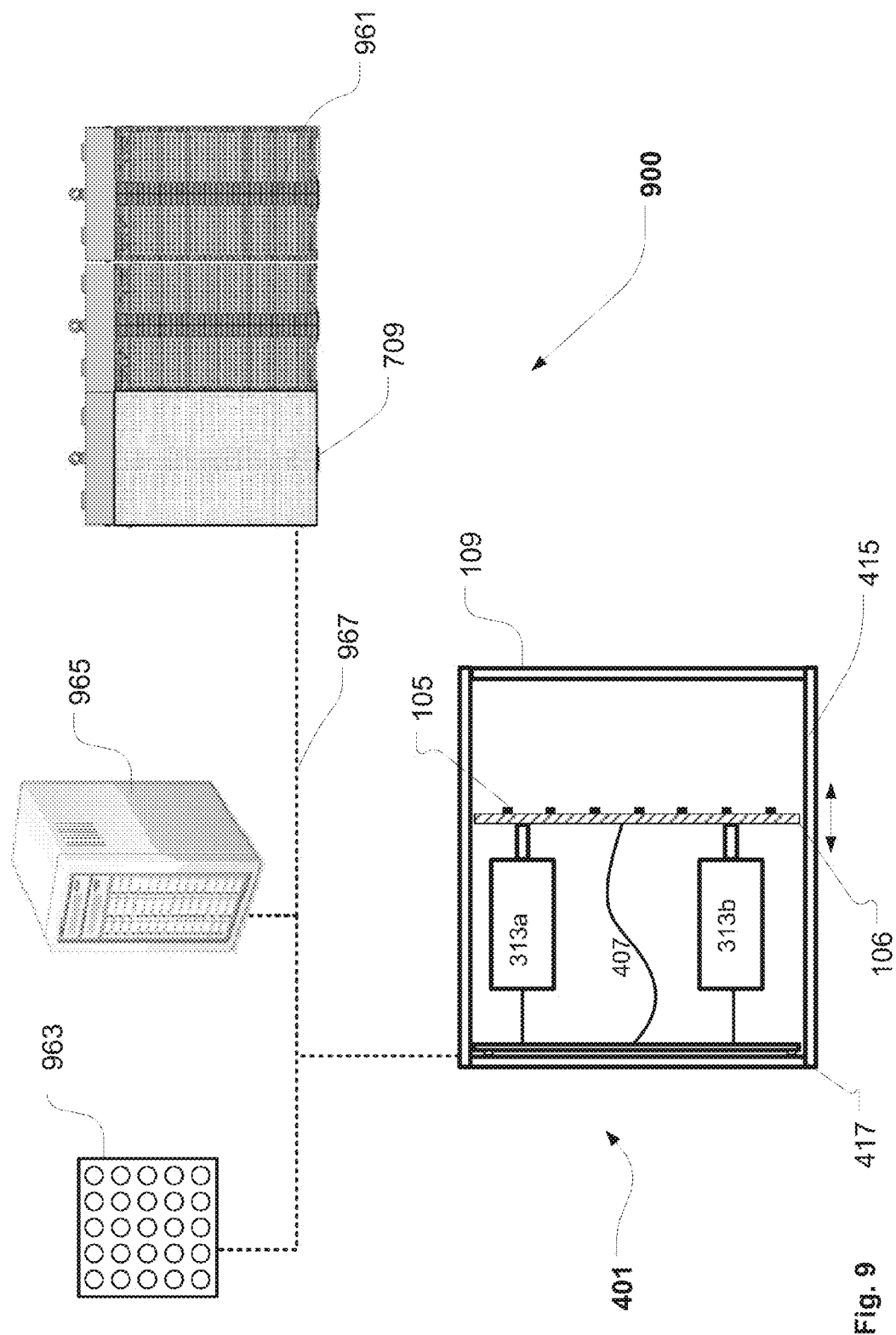
FIG. 9 illustrates a block diagram of a display system according to the present invention.

FIG. 9 illustrates a block diagram of a display system 900 according to one aspect of the present invention. The display system 900 comprises a number of LED pixel devices, where LED pixel device 961 is LED pixel screen with a large number of LED pixels (+1000), LED pixel device 963 is a LED pixel device with 25 LED pixels and where LED pixel device 401 is a LED pixel device according to the present invention and similar to the once described in FIG. 4*a*-4*b*. The display system comprises a central controller 965 which is connected to the LED pixel devices via a communication system as illustrated by the dotted lines 967. The central controller 965 can be embodied as a media server or light controller capable of sending pixel data and/or video data to the LED pixel devices. Further the central controller 965 is adapted to receive data from the LED pixels device through the communication system. The communication system can be embodied as any known communication system and based on any known communication protocols E.g. an Ethernet based system (both wired and/or wireless), serial protocols, DMX/RDM based protocols, Artnet etc. The central controller can comprise a number of video inputs capable of receiving any video signal or format and provide the content to the pixels of the display system. The central controller can in additional be coupled to other kinds of displays for instance high or medium resolution LED video screens, projector or the like or a number of light fixtures. A part of the LED pixel device 961 has been covered by an optical diffuser 709 as described in FIG. 7*a*-7*b*. The optical diffuser 709 can also be embodied as a flexible optical diffuser 809 as described in FIG. 8*a*-*b*.

The central controller is adapted to send both LED pixel data and actuator data to the LED pixel device 401 through the communication system. Also the central controller can send actuator data to the optical diffuser 709 arranged in front of a part of the LED pixel device 961. It is noticed that any of the LED pixel according to the present invention can be integrated in the display system either as additional components or by replacing any of the shown LED pixel devices. The actuator data is indicative of instructions to the actuators and indicate for instance position, movement speed, time of movement etc.

The central controller can be a media server or any computer based server capable of controlling content to LED pixel devices and/or light fixtures. Further the central controller may be embodied as any light controller known in the art range in for complex controllers with many functions to simple light controllers with less functions and light controllers can also be embodied as PC, laptops, tablets, smart phones etc.

Figure 10:
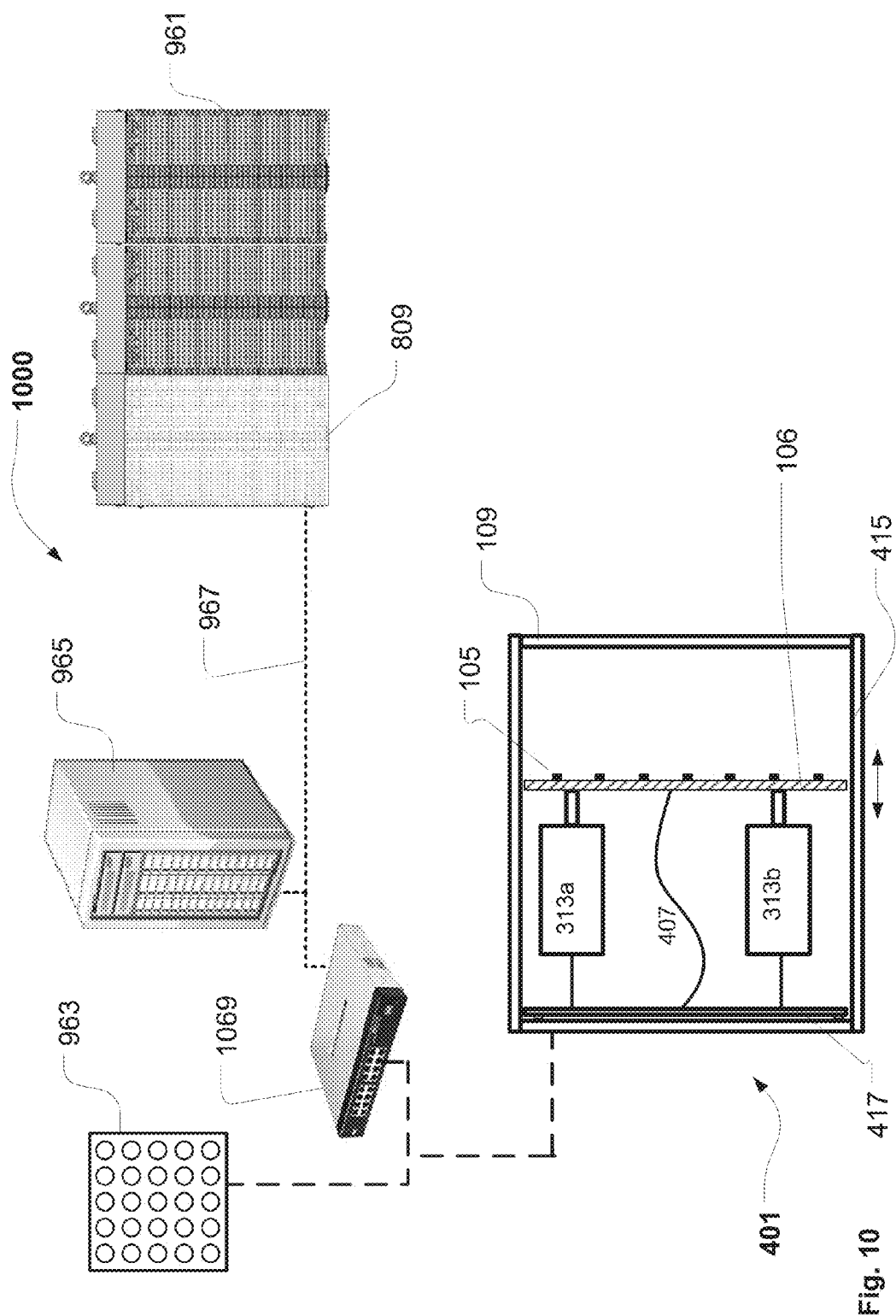
FIG. 10 illustrates a block diagram of another embodiment of a display system according to the present invention.

FIG. 10 illustrates a block diagram of a display system 1000 according to one aspect of the present invention. The display system is similar to the display system illustrated in FIG. 9 and similar elements are labeled with the same reference numbers and will not be described further. The display system comprises a data and power feeder 1069 the data and power feeder is connected to the central controller through a first communication system based on a first communication protocol. For instance a broadband and high speed Ethernet system. The data and power feeder 1069 is connected to a number of LED pixel devices through a second communication system based on a second communication protocol e.g. based on a DMX/RDM protocol. The data and power feed is further adapted to supply power the LED devices for instance in in dedicated power conductors integrated with the communication conductors of the second communication system. However it is noticed that power and communication signals also can be provided through the same conductor. The data and power feed can also be adapted to receive the output signal indicative of the pixel setting of the LED device from LED pixel device 701 and sends the pixel setting to the central controller, which the can be adapted to adjust its' controlling of the LED pixel device based on the converted output signal in as similar way as described above.

Figure 11A:
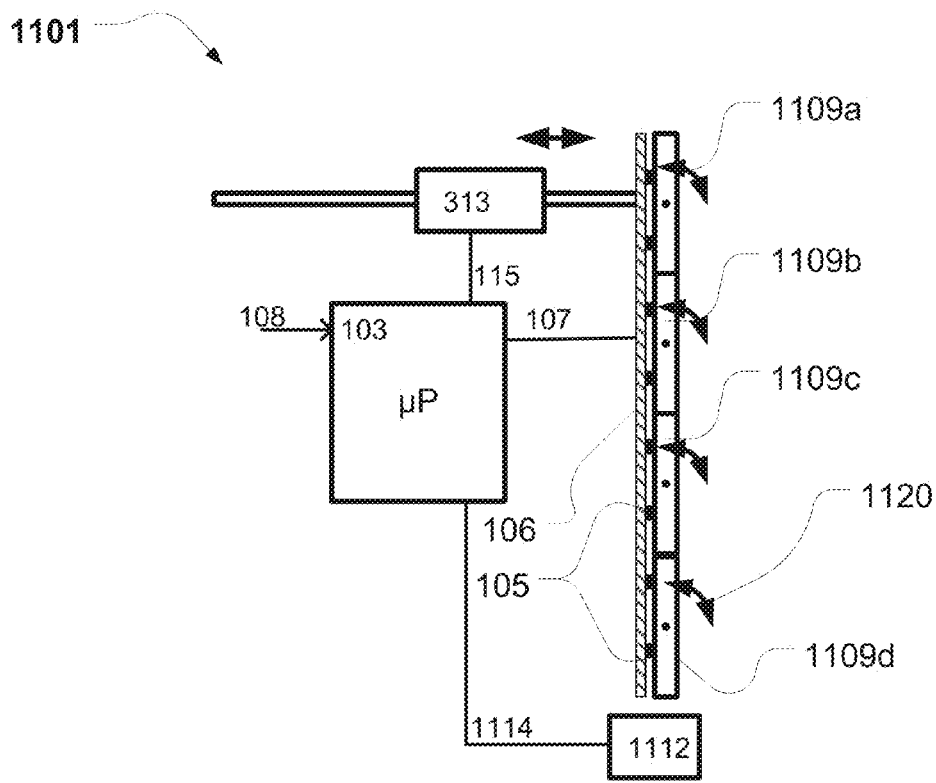
FIG. 11a-11b illustrate another embodiment of a LED pixel device according to the present invention.
Figure 11B:
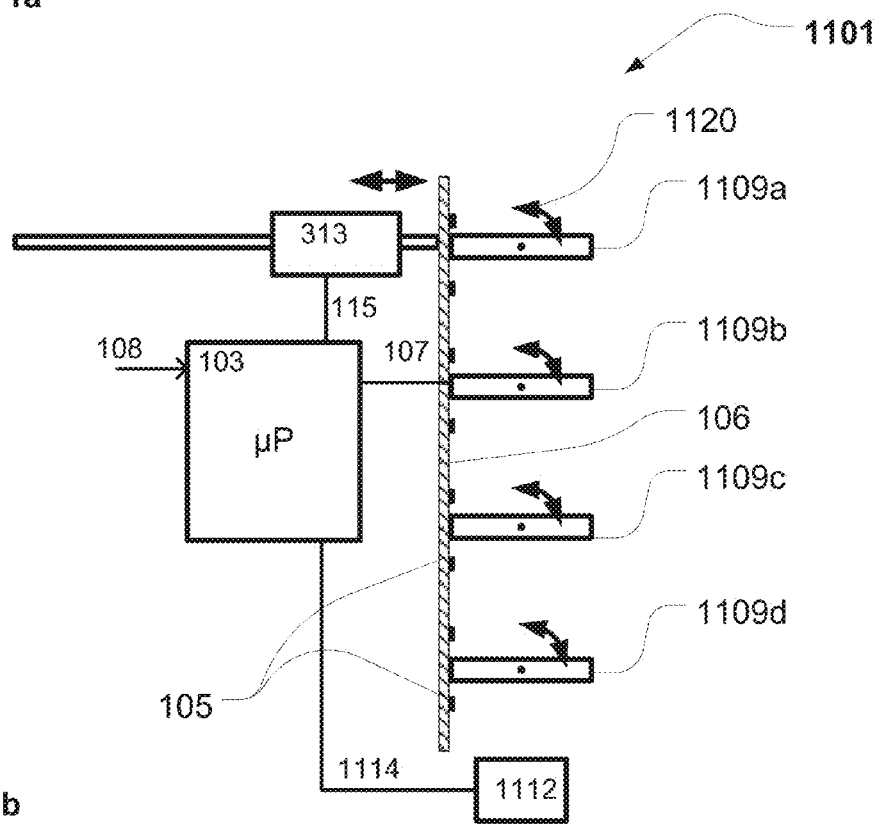

FIGS. 11*a* and 11*b* illustrate another embodiment of a LED pixel device 1101 according to the present invention. This LED pixel device is similar to the LED pixel device 301 shown in FIG. 3*a*-3*d* and substantial identical features are labeled with the same reference numbers as in FIG. 3*a*-3*d* and will not be described in further detail. In this embodiment the optical diffuser is embodied a number of optical diffusing lamellas 1109*a*-1109*d*, which each can be rotated in relation the LED pixels 105 as illustrated by arrows 1120. The optical diffusing lamellas 1109*a*-*d* can for instance be mounted in a frame (not shown) which enables the lamellas to rotate between a diffusing position (FIG. 11*a*) and a non-diffusing position (FIG. 11*b*). In the diffusing position the lamellas receive light from the LED pixels and diffuse the received light and in the non-diffusing position the optical diffusing lamellas will not diffuse light, as the light from the LED pixels will pass beside the optical diffusing lamellas. As a consequence the diffusing effect can be eliminated as the situation in FIG. 11*b* and the LED pixels will thus appear as very sharp pixels without any diffusing effect. The illumination device can comprise a rotating actuator 1122 adapted to rotate the optical diffusing lamellas in relation to the LED pixels. The rotating actuator can be instructed by the controller 103 through a communication line 1114. The mechanism connecting the rotating actuator and the diffusing lamellas can be constructed in many ways for instance by using gears, belts string etc.

The invention claimed is:

1. A light-emitting diode JLEDJ pixel devices comprising:
   a plurality of individual controllable LED pixels arranged in an array;
   a LED pixel controller adapted to control said plurality of individual controllable LED pixels;
   a visible optical diffuser arranged in front of at least a part of said LED pixels, said visible optical diffuser receive light from said LED pixels and diffuses the received light, said visible optical diffuser is visible from the front of said LED pixel device and is configured to change the appearance of said LED pixels;
   at least one diffuser actuator adapted to move said LED pixels and said visible optical diffuser in relation to each other; and
   a diffuser controller adapted to control said diffuser actuator; wherein said visible optical diffuser and said LED pixels can be moved between a non-mixing position and a mixing position, wherein said non-mixing position the light emitted by said LED pixels are separated when hitting said visible optical diffuser and wherein said mixing position the light emitted by said LED pixels are at least partial overlapping when hitting said visible optical diffuser.

2. A LED pixel device according to claim 1, wherein said visible optical diffuser in said non-mixing position is arranged adjacent to said LED pixels.

3. A LED pixel device according to claim 1, wherein said diffuser controller is adapted to control said diffuser actuator based on an input signal being indicative a position of said LED pixels in relation to said visible optical diffuser.

4. A LED pixel device according to claim 1, wherein said LED pixels and said visible optical diffuser are movable in relation to each other along the light emitting axes of said LED pixels.

5. A LED pixel device according to claim 1, wherein said LED pixels and said visible optical diffuser are rotatable in relation to each other.

6. A LED pixel device according to claim 1, wherein a plurality of diffuser actuators are adapted to move different parts of said LED pixels and different parts of said visible optical diffuser in relation to each other, and wherein said diffuser controller is adapted to control said plurality of diffuser actuators individually.

7. An visible optical diffuser for a light-emitting diode (LED) pixel device, said visible optical diffuser comprises:
   an visible optical diffuser;
   at least one mounting mechanism adapted to arrange said visible optical diffuser in front of said LED pixel device such that said optical diffuser receives light from a plurality of LED pixels at said LED pixel device and diffuses the received light and said visible optical diffuser is visible from the front of said LED pixel device and is configured to change the appearance of said LED pixels; and
   at least one diffuser actuator adapted to move said visible optical diffuser in relation to said LED pixel device;
   wherein said mounting mechanism and said diffuser actuator are configured to move said visible optical diffuser in relation to said LED pixels between a non-mixing position and a mixing position, where in said non-mixing position the light emitted by said LED pixels are separated when hitting said visible optical diffuser and where in said mixing position the light emitted by said LED pixels are at least partial overlapping when hitting said visible optical diffuser.

8. An visible optical diffuser according to claim 7, where in said non-mixing position said mounting mechanism and said diffuser actuator are configured to arrange said visible optical diffuser adjacent said LED pixels.

9. An visible optical diffuser according to claim 7, wherein said visible optical diffuser comprises a diffuser controller adapted to control said diffuser actuator.

10. A visible optical diffuser according to claim 7, wherein said visible optical diffuser comprises a receiver adapted to receive an input signal indicative of the position of said visible optical diffuser in relation to said LED pixels.

11. A visible optical diffuser according to claim 10, wherein said receiver being connectable to the same communication system as said LED pixel device.

12. An visible optical diffuser according to claim 7, wherein a plurality of diffuser actuators are adapted to moved different parts of said visible optical diffuser in relation to said LED pixels and wherein said diffuser controller is adapted to control said plurality of diffuser actuators individually.

13. A display system comprising a central controller and a number of light-emitting diode (LED) pixel devices, wherein said central controller and said number of LED pixel devices are connected through at least one communication system, said number of LED pixel devices comprises a number of LED pixels and said central controller being adapted to control said LED pixels of said LED pixel devices by sending pixel data to said LED pixel devices through said communication system, wherein at least one of said LED pixel devices comprises:
   a plurality of individual controllable LED pixels arranged in an array;
   a LED pixel controller adapted to control said plurality of individual controllable LED pixels; a visible optical diffuser arranged in front of at least a part of said LED pixels, said visible optical diffuser receive light from said LED pixels and diffuses the received light, said visible optical diffuser is visible from the front of said LED pixel device and is configured to change the appearance of said LED pixels;
   at least one diffuser actuator adapted to move said LED pixels and said visible optical diffuser in relation to each other; and a diffuser controller adapted to control said diffuser actuator; wherein said visible optical diffuser and said LED pixels can be moved between a non-mixing position and a mixing position, where in said non-mixing position the light emitted by said LED pixels are separated when hitting said visible optical diffuser and wherein said mixing position the light emitted by said LED pixels are at least partial overlapping when hitting said visible optical diffuser; and wherein said central controller being adapted to control said diffuser actuator through said communication system by sending said actuator data to said LED pixel device.

14. A method of controlling a light-emitting diode (LED) pixel device, wherein said LED pixel device comprises:
   a plurality of individual controllable LED pixels arranged in an array;
   a LED pixel controller adapted to control said plurality of individual controllable LED pixels;

an visible optical diffuser arranged in front of at least a part of said LED pixels, said optical diffuser receive light from said LED pixels and diffuses the received light, and said visible optical diffuser is visible from the front of said LED pixel device and is configured to change the appearance of said LED pixels;

said method comprises the steps of:

controlling the LED pixels using said LED pixel controller;

moving at least a part of said LED pixels and said visual optical diffuser in relation to each other using at least one diffuser actuator, wherein said step of moving at least a part of said LED pixels and said visual optical diffuser comprises the step of moving said LED pixels and said visual optical diffuser between a non-mixing position and a mixing position, wherein said non-mixing position the light emitted by said LED pixels are separated when hitting said visual optical diffuser and where in said mixing position the light emitted by said LED pixels are at least partial overlapping when hitting said visual optical diffuser.

15. A method according to claim 13, wherein said step of moving at least a part of said LED pixels and said visual optical diffuser in relation to each other comprises the step of arranging said visual optical diffuser adjacent said LED pixels.

16. A method according to claim 14, wherein said step of moving at least a part of said LED pixels and said visual optical diffuser in relation to each other comprises the step of arranging a first part of said visual optical diffuser and a second part of said visual optical diffuser at different distances in relation to said LED pixels.

17. A display system comprising a central controller and a number of light-emitting diode (LED) pixel devices, wherein said central controller and said number of LED pixel devices are connected through at least one communication system, said number of LED pixel devices comprises a number of LED pixels, and said central controller being adapted to control said LED pixels of said LED pixel devices by sending pixel data to said LED pixel devices through said communication system, wherein at least one of said LED pixel comprises a visible optical diffuser comprising:

an visible optical diffuser;

at least one mounting mechanism adapted to arrange said visible optical diffuser in front of said LED pixel device such that said optical diffuser receives light from a plurality of LED pixels at said LED pixel device and diffuses the received light and said visible optical diffuser is visible from the front of said LED pixel device and is configured to change the appearance of said LED pixels;

at least one diffuser actuator adapted to move said visible optical diffuser in relation to said LED pixel device; and wherein said mounting mechanism and said diffuser actuator are configured to move said visible optical diffuser in relation to said LED pixels between a non-mixing position and a mixing position, wherein said non-mixing position the light emitted by said LED pixels are separated when hitting said visible optical diffuser and where in said mixing position the light emitted by said LED pixels are at least partial overlapping when hitting said visible optical diffuser, and wherein said central controller being adapted to control said diffuser actuator through said communication system by sending said actuator data to visible optical diffuser.

18. A LED pixel device according to claim 1, wherein said plurality of LED pixels, said LED pixel controller, and said at least one diffuser actuator are arranged in a housing, and wherein said visible optical diffuser is arranged in the front end of said housing.

19. A LED pixel device according to claim 18, wherein said visible optical diffuser is fixed at the front of said housing, and said LED pixels are arranged on a PCB that can be moved by actuators.

20. A light-emitting diode (LED) pixel device, comprising:

a plurality of individual controllable LED pixels arranged in an array;

a LED pixel controller adapted to control said plurality of individual controllable LED pixels;

a visible optical diffuser arranged in front of at least a part of said LED pixels, said visible optical diffuser receive light from said LED pixels and diffuses the received light, said visible optical diffuser is visible from the front of said LED pixel device and is configured to change the appearance of said LED pixels;

at least one diffuser actuator adapted to move said LED pixels and said visible optical diffuser in relation to each other; a diffuser controller adapted to control said diffuser actuator; wherein said visual optical diffuser comprises a plurality of optical diffusing lamellas, where said optical diffusing lamellas are rotatable around an axis substantially parallel with said array and between a non-diffusing position and a diffusing position.

* * * * *